(12) United States Patent
Willett

(10) Patent No.: US 8,996,368 B2
(45) Date of Patent: Mar. 31, 2015

(54) ONLINE MAXIMUM-LIKELIHOOD MEAN AND VARIANCE NORMALIZATION FOR SPEECH RECOGNITION

(75) Inventor: Daniel Willett, Walluf (DE)

(73) Assignee: Nuance Communications, Inc., Burlington, MA (US)

(*) Notice: Subject to any disclaimer, the term of this patent is extended or adjusted under 35 U.S.C. 154(b) by 344 days.

(21) Appl. No.: 13/518,405

(22) PCT Filed: Feb. 22, 2010

(86) PCT No.: PCT/US2010/024890
§ 371 (c)(1),
(2), (4) Date: Jun. 22, 2012

(87) PCT Pub. No.: WO2011/102842
PCT Pub. Date: Aug. 25, 2011

(65) Prior Publication Data
US 2012/0259632 A1    Oct. 11, 2012

(51) Int. Cl.
*G10L 15/00* (2013.01)
*G10L 15/02* (2006.01)
*G10L 15/20* (2006.01)
*G10L 15/08* (2006.01)
*G10L 15/34* (2013.01)

(52) U.S. Cl.
CPC ............... *G10L 15/02* (2013.01); *G10L 15/20* (2013.01); *G10L 15/08* (2013.01); *G10L 15/34* (2013.01)
USPC ........... 704/234; 704/231; 704/246; 704/247; 704/251; 704/252

(58) Field of Classification Search
USPC .................. 704/231, 234, 246, 247, 251, 252
See application file for complete search history.

(56) References Cited

U.S. PATENT DOCUMENTS

| 5,794,189 A | 8/1998 | Gould |
| 6,167,377 A | 12/2000 | Gillick et al. |
| 2002/0091521 A1* | 7/2002 | Yuk et al. .................. 704/240 |
| 2004/0019483 A1* | 1/2004 | Deng et al. ................. 704/239 |
| 2006/0009972 A1* | 1/2006 | Yuk et al. .................. 704/234 |
| 2008/0004876 A1 | 1/2008 | He et al. |
| 2010/0138222 A1* | 6/2010 | Herbig et al. ................. 704/243 |

OTHER PUBLICATIONS

Yongxin Li et al., "Incremental on-line feature space MLLR adaptation for telephony speech recognition." ICSLP 2002, 7th Intl. Conference on Spoken Language Processing. Denver, CO. Sep. 16, 2002.

(Continued)

*Primary Examiner* — Leonard Saint Cyr
(74) *Attorney, Agent, or Firm* — Banner & Witcoff, Ltd.

(57) ABSTRACT

A feature transform for speech recognition is described. An input speech utterance is processed to produce a sequence of representative speech vectors. A time-synchronous speech recognition pass is performed using a decoding search to determine a recognition output corresponding to the speech input. The decoding search includes, for each speech vector after some first threshold number of speech vectors, estimating a feature transform based on the preceding speech vectors in the utterance and partial decoding results of the decoding search. The current speech vector is then adjusted based on the current feature transform, and the adjusted speech vector is used in a current frame of the decoding search.

24 Claims, 2 Drawing Sheets

(56) References Cited

OTHER PUBLICATIONS

Pujol, P. et al., "On real-time mean-and-variance normalization of speech recognition features." Proceedings of IEEE Intl. Conference on Acoustics, Speech and Signal Processing, 2006. Toulouse, France. May 14-19, 2006. Piscataway, NJ, USA. Jan. 1, 2006. pp. I-I. ISBN 1-4244-0469-8.

Viikki O. et al., "A recursive feature vector normalization approach for robust speech recognition in noise." Proceedings of the IEEE Intl. Conference on Acoustics, Speech and Signal Processing. 1998. Seattle, WA, USA. May 12-15, 1998. vol. 2. May 12, 1998, pp. 733-736. ISBN 978-0-7803-4428-0.

Xiaodong Cui et al., "Improving online incremental speaker adaptation with eigen feature space MLLR." Automatic Speech Recognition & Understanding. 2009. ASRU 2009. IEEE Workshop ON, IEEE. Piscataway, NJ, USA. Nov. 13, 2009. pp. 136-140.

Xin Lei et al., "Deep neural networks with auxiliary Gaussian mixture models for real-time speech recognition." ICASSP 91. Intl. Conference on Acoustics, Speech, and Signal Processing. Institute of Electrical and Electronics Engineers. Piscataway, NJ, USA. May 26, 2013. pp. 7634-7638.

Gales M. J. F. "Maximum likelihood linear transformations for HMM-based speech recognition." Computer Speech and Language. Elsevier, London, Great Britain. vol. 12, No. 2. Apr. 1, 1998. pp. 75-98.

Stemmer G. et al. "Adaptive Training Using Simple Target Models." 2005 IEEE Intl. Conference on Acoustics, Speech and Signal Processing. IEEE. Piscataway, NJ, USA. vol. 1. Mar. 18, 2005. pp. 997-1000.

International Search Report and Written Opinion for PCT/US2010/024890 mailed Aug. 11, 2010.

EPO Communication for EP Pat. App. No. 10708447.7 mailed Jun. 12, 2013.

EPO Communication for EP Pat. App. No. 10708447.7 mailed Dec. 18, 2013.

EPO Communication for EP Pat. App. No. 10708447.7 mailed May 26, 2014.

\* cited by examiner

ONLINE MAXIMUM-LIKELIHOOD MEAN AND VARIANCE NORMALIZATION FOR SPEECH RECOGNITION

FIELD OF THE INVENTION

The invention generally relates to computer processor implemented systems for automatic speech recognition (ASR), and more specifically to feature normalization of ASR systems.

BACKGROUND ART

An automatic speech recognition (ASR) system tries to determine a representative meaning (e.g., text) corresponding to input speech. Typically, the input speech is processed into a sequence of digital frames. Each frame can be thought of as a multi-dimensional vector that represents various characteristics of the speech signal present during a short time window of the speech. In a continuous recognition system, variable numbers of frames are organized as "utterances" representing a period of speech followed by a pause which in real life loosely corresponds to a spoken sentence or phrase.

The system compares the input utterances to find acoustic models that best match the vector sequence characteristics and determines corresponding representative text associated with the acoustic models. Modern acoustic models typically use state sequence models such as Hidden Markov Models that model speech sounds (usually phonemes) using mixtures of probability distribution functions, typically Gaussians. Phoneme models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

In order to compensate for channel effects, it is common practice in ASR systems to perform mean and variance normalization of the extracted features before applying statistical models to translate the features into most probably uttered word sequences. This feature normalization is usually referred to as Channel (or Cepstral) Mean/Variance Normalization (CMN/CVN). The most common approach tries to estimate the true per feature mean and variance over an utterance or utterance sequence or over a windowed-out part of an utterance or utterance sequence. The feature vectors are shifted and scaled by the estimated means and variances aiming at zero mean and unity variances for the normalized features.

SUMMARY OF THE INVENTION

Embodiments of the present invention are directed to feature transformation for speech recognition. An input speech utterance is processed to produce a sequence of representative speech vectors. A time-synchronous speech recognition pass is performed using a decoding search to determine a recognition output corresponding to the speech input. The decoding search includes, for each speech vector after some first threshold number of speech vectors, estimating a feature transform based on the preceding speech vectors in the utterance and partial decoding results of the decoding search. The current speech vector is then adjusted based on the current feature transform, and the adjusted speech vector is used in a current frame of the decoding search.

In specific embodiments, for each speech vector before the first threshold number of speech vectors, the feature transform is estimated based on a conventional feature normalization transform. In further such embodiments, for each speech vector after the first threshold number of speech vectors and before some second threshold number of speech vectors, the feature transform is interpolated between a transform based on conventional feature normalization and a transform based on the preceding speech vectors in the utterance and partial decoding results of the decoding search.

The feature transform may be based on maximizing the likelihood of observing the preceding speech vectors. Either a most likely state alignment or an approximate state alignment may be used for estimating the feature transform. And the adaptation statistics required for the feature transform may be accumulated incrementally. The feature transform may be a constrained maximum likelihood linear regression (CMLLR) feature transform and/or a diagonal-only feature transform.

Embodiments of the present invention also include a speech recognition engine implemented as various computer processes functioning in a computer processor and using a method according to any of the foregoing. Embodiments also include a computer program product implemented in a computer readable storage medium for speech recognition and including program code for performing a method according to any of the forgoing.

DETAILED DESCRIPTION OF SPECIFIC EMBODIMENTS

One approach to feature normalization can be referred to generically as "Maximum-Likelihood Mean and Variance Normalization" (MLMVN), where feature normalization is approached via shifting and scaling as with CMN and CVN, but the shifting and scaling is tuned per utterance to maximize likelihood based on the acoustic models of the underlying speech recognizer. This can be thought of as applying Constrained Maximum Likelihood Linear Regression (CMLLR—see, e.g., M. J. F. Gales, Maximum Likelihood Liner Transformations For HMM-Based Speech Recognition, Computer Speech and Language, vol. 12, 1998; incorporated herein by reference) per utterance in a self-adaptation mode with a diagonal transformation matrix and a bias term that allows a scaling and shift in feature space.

Generic MLMVN can be implemented using a two-pass recognition approach. A first pass is used to establish a transcription ("pseudo truth") for estimation of the MLMVN transform, and then a second pass is performed in which this MLMVN transform gets applied. But such a two-pass recognition arrangement comes along with additional computations, and—since the second pass needs to be computed after an utterance has been fully spoken—it also adds a performance latency which is not acceptable in many applications.

Embodiments of the present invention are directed to a novel MLMVN approach in an online arrangement using single pass recognition without any additional latency due to a second recognition pass. Such embodiments still have the potential of achieving similar performance gains, and actually even higher gains when compared to a two pass MLMVN scheme in which the second pass performs a strongly constrained search or re-scoring. Specific embodiments are based on the continuous re-estimation of a CMLLR feature transform within a single time-synchronous recognition pass.

Figure 1:
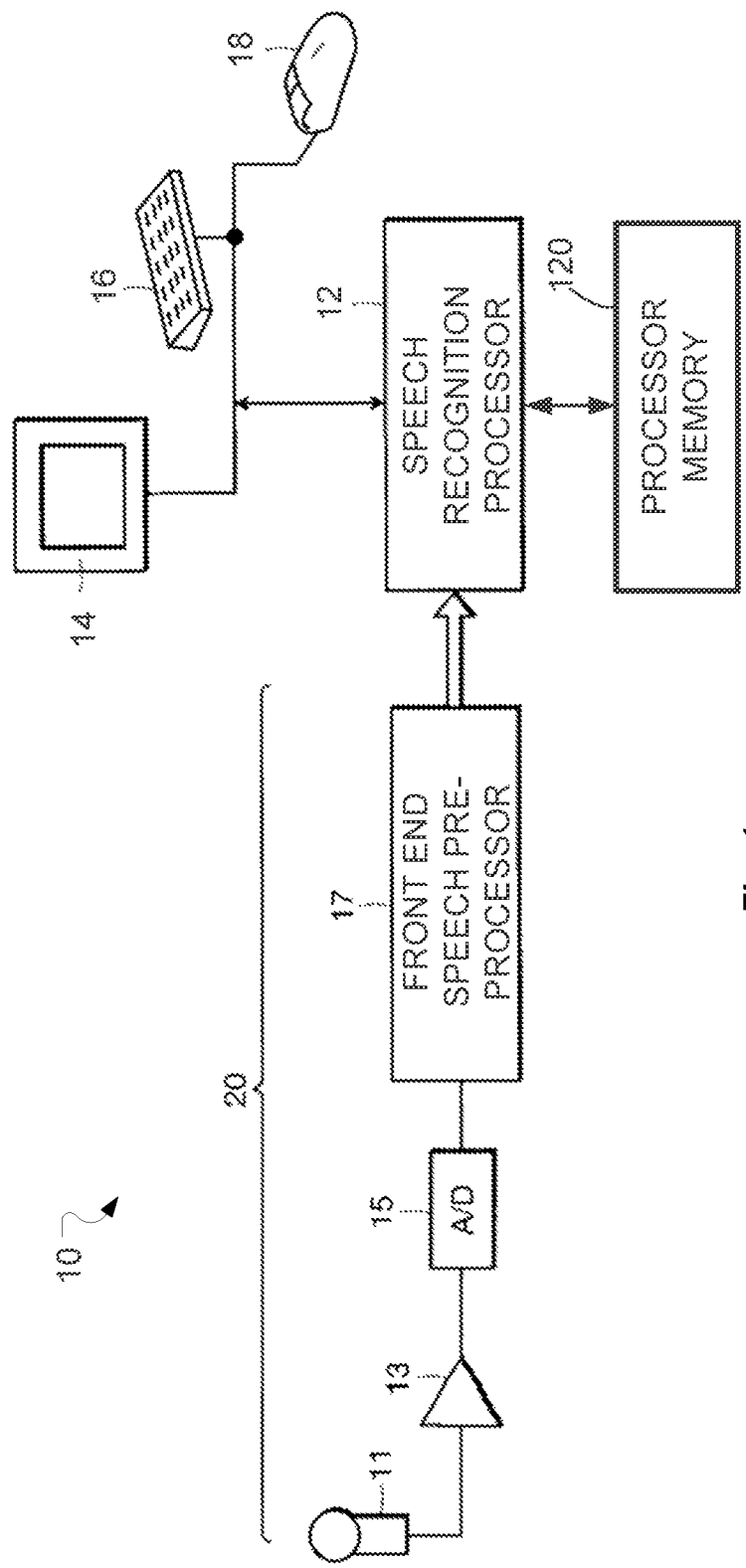
FIG. 1 is a block diagram representing various hardware components of an embodiment of a speech recognition system according to the present invention.

FIG. 1 shows various hardware components of an embodiment of an ASR system according to the present invention. A computer system 10 includes a speech input microphone 11 which is connected through a suitable preamplifier 13 to an analog-to-digital (A/D) converter 15. A front-end speech preprocessor 17 typically performs a Fourier transform so as to extract spectral features to characterize the input speech as a sequence of representative multi-dimensional vectors. A speech recognition processor 12, e.g., an Intel Core i7 processor or the like, is programmed to run one or more specialized computer software processes to determine a recognition output corresponding to the speech input. To that end, processor memory 120, e.g., random access memory (RAM) and/or read-only memory (ROM) stores the speech processing software routines, the speech recognition models and data for use by the speech recognition processor 12. The recognition output may be displayed, for example, as representative text on computer workstation display 14. Such a computer workstation would also typically include a keyboard 16 and a mouse 18 for user interaction with the system 10. Of course, many other typical arrangements are also familiar such as an ASR implemented for a mobile device such as a cell phone, ASR for the cabin of an automobile, client-server based ASR, etc.

Figure 2:
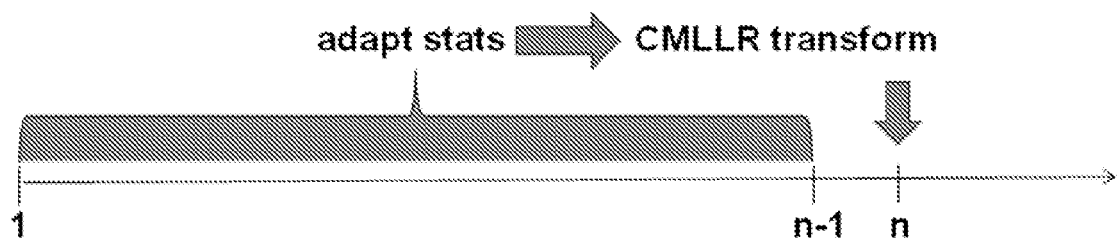
FIG. 2 illustrates the idea of online feature transform estimation according to one specific embodiment of the present invention.

A novel and inventive method for online adaptation of features in speech recognition can be implemented in the specific form of computer processes that function in a computer processing environment such as described in the preceding paragraph. Specifically, one or more computer processes operate in an ASR system to process a speech input to produce a sequence of representative speech vectors. A time-synchronous speech recognition pass is performed based on the speech vectors to determine a recognition output. In the decoding search for the recognition pass, for each speech vector after some first threshold number of speech vectors (>n), a feature transform is estimated to adjust the speech vector based on the preceding speech vectors in the utterance and the partial decoding results of the decoding search. FIG. 2 shows that in time synchronous deciding, when proceeding from time n−1 to time n, a new feature transform is estimated based on the observed feature vectors 0 . . . n−1. This feature transform gets applied on the feature vector at time step n. More formally, we apply a transform $M_n$ for normalization of bias-extended feature vector $f_n$:

$$f_n' = M_n f_n$$

with $M_n$ estimated such that is maximizes the likelihood of the observation as seen and aligned up to this time step:

$$M_n = \mathrm{argmax}_M \sum_{i=0}^{n-1} p(M f_i | w_i)$$

Once the feature transform is estimated, the current speech vector is then adjusted based on the current feature transform, and the adjusted speech vector is used in a current frame of the decoding search.

A pseudo code representation of such an embodiment might be set forth as follows:

```
Process DecodingWithOnlineFeatureTransfromAdaptation
process input to produce sequence of speech vectors;
perform single recognition pass decoding search going
    synchronously over speech frames i = 1 ... N
  if i >= t₁
    estimate feature transform based on the preceding speech
      vectors in the utterance and partial decoding results the
      decoding search;
  if i < t₂
    smooth this transform with identity matrix or conventional
      feature transforms (see Fig.3)
  adjust current speech vector based on feature transform;
  else
    adjusted speech vector = current speech vector
  use adjusted speech vector in current frame of decoding search.
```

To implement such an arrangement, it may be useful to assume that the frame labels $w_i$ are in a state alignment of the features frames based on the partial decoding performed until frame n−1. This can either be:

(a) the actual most likely state alignment given the partial decoding up to frame n−1, or (b) an approximate state assignment that assigns the most likely frame labels $w_i$ when decoding at step i without re-visiting this state assignment after having looked deeper into future frames beyond i.

The approach (a) is more exact, but approach (b) has the advantage of maintaining the state assignment once set. The approximation of approach (b) allows a very efficient accumulation of successive CMLLR statistics and the realization of the proposed per frame re-tuning of the normalization with only minor computes. Other variations of approach (a) for increased efficiency are viable, such as a re-adjustment of the alignment in certain intervals of m (e.g., 20 frames).

One specific embodiment applies one diagonal-only CMLLR transform with a bias term. This has the advantage of a computationally inexpensive closed form solution that only needs to solve a quadratic equation and therefore requires fewer computes for accumulating the adaptation statistics. As a result, the frequent re-estimation of the feature transform is computationally feasible. In addition, the diagonal+bias transform can be robustly estimated from just a small amount of data and even is somewhat robust against mislabeled frames. The adaptation statistics required for the feature transform may be accumulated incrementally.

Figure 3:
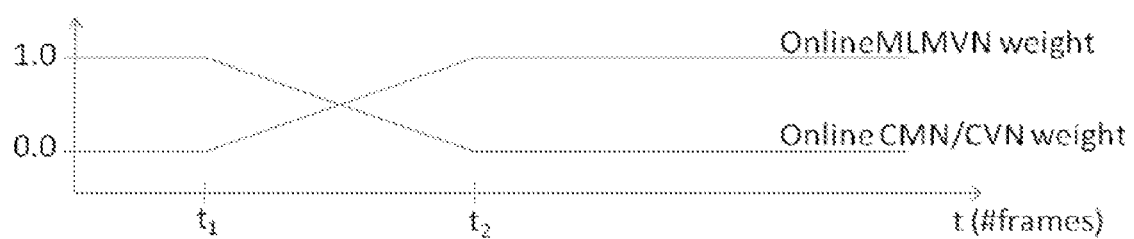
FIG. 3 illustrates the idea of smoothing the feature transform during the initial input speech vector frames.

When an input utterance initially starts, however, and only a small number of frames have been processed, an online feature transform completely as described above cannot be fully and reliably estimated. To compensate for this, some data smoothing can be applied to the estimated feature transform based on conventional online CMN and CVN transforms as already known in the art. For example, FIG. 3 illustrates one specific form of this idea where a first threshold minimum number of frames $t_1$ is needed for the online calculation of an MLMVN feature transform to come into effect at all, and a second threshold $t_2$ ($t_2 > t_1$) that determines the range in which a linear interpolation between the conventional CMN/CVN transform and the online MLMVN transform is performed. Once the number of observed frames exceeds the second threshold $t_2$, then the unsmoothed online MLMVN feature transforms can be applied. The two thresholds $t_1$ and $t_2$ can be tuned based on development data. It may be useful to only estimate the online MLMVN feature transform based frames representing speech (those aligned to speech states), suggesting that only the number of non-silence frames is considered when comparing against the transform smoothing thresholds. Of course, other smoothing arrangements are equally possible.

In a preliminary experimental evaluation testing some of these ideas, one specific embodiment achieved about a 15% word error rate reduction (WERR) compared to a single recognition pass that applied a conventional online channel mean adaptation. There even was observed to be a small gain in WERR as compared to an arrangement using two-pass recognition with MLMVN applied in the second pass which was constrained by a grammar based on the first pass lattice output.

Embodiments of the present invention also include a speech recognition engine implemented as a computer processes in a computer processor and using a method according to any of the arrangements described above. And embodiments also include a computer program product implemented in a computer readable storage medium for speech recognition which includes program code for performing a method according to any of the arrangements described above.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
in one or more computer processes functioning in at least one computer processor:
processing an input speech utterance to produce a sequence of representative speech vectors; and
performing a single time-synchronous speech recognition pass using a decoding search to determine a recognition output corresponding to the speech input, the decoding search including:
  i. for each speech vector before some first threshold number of speech vectors, estimating a feature transform based on a conventional feature normalization transform,
  ii. for each speech vector after the first threshold number of speech vectors, estimating the feature transform based on the preceding speech vectors in the utterance and partial decoding results of the decoding search,
  iii. adjusting a current speech vector based on the feature transform, and
  iv. using the adjusted current speech vector in a current frame of the decoding search;
wherein for each speech vector after the first threshold number of speech vectors and before a second threshold number of speech vectors, the feature transform is interpolated between the transform based on the conventional feature normalization and the transform based on the preceding speech vectors in the utterance and the partial decoding results of the decoding search.

2. A method according to claim 1, wherein the feature transform is based on maximizing the likelihood of observing the preceding speech vectors.

3. A method according to claim 2, wherein a most likely state alignment is used for estimating the feature transform.

4. A method according to claim 2, wherein an approximate state alignment is used for estimating the feature transform.

5. A method according to claim 2, wherein adaptation statistics required for the feature transform are accumulated incrementally.

6. A method according to claim 1, wherein the feature transform is a constrained maximum likelihood linear regression (CMLLR) feature transform.

7. A method according to claim 1, wherein the feature transform is a diagonal-only feature transform.

8. A method according to claim 1, wherein the time-synchronous speech recognition pass is part of a multi-pass recognition process.

9. A system comprising:
a microphone that receives input speech;
at least one computer processor that performs one or more computer processes that cause the system to:
process an input speech utterance corresponding to the input speech to produce a sequence of representative speech vectors, and
perform a single time-synchronous speech recognition pass using a decoding search to determine a recognition output corresponding to the speech input, wherein during the decoding search the system:
i. for each speech vector before some first threshold number of speech vectors, estimates a feature transform based on a conventional feature normalization transform,
ii. for each speech vector after the first threshold number of speech vectors, estimates the feature transform based on the preceding speech vectors in the utterance and partial decoding results of the decoding search,
iii. adjusts a current speech vector based on the feature transform, and
iv. uses the adjusted current speech vector in a current frame of the decoding search;
wherein for each speech vector after the first threshold number of speech vectors and before some second threshold number of speech vectors, the feature transform is interpolated between the transform based on the conventional feature normalization and the transform based on the preceding speech vectors in the utterance and the partial decoding results of the decoding search.

10. The system of claim 9 wherein the feature transform is based on maximizing the likelihood of observing the preceding speech vectors.

11. The system of claim 10 wherein a most likely state alignment is used for estimating the feature transform.

12. The system of claim 10 wherein an approximate state alignment is used for estimating the feature transform.

13. The system of claim 10 wherein adaptation statistics required for the feature transform are accumulated incrementally.

14. The system of claim 9 wherein the feature transform is a constrained maximum likelihood linear regression (CMLLR) feature transform.

15. The system of claim 9 wherein the feature transform is a diagonal-only feature transform.

16. The system of claim 9 wherein the time-synchronous speech recognition pass is part of a multi-pass recognition process.

17. An apparatus storing computer-readable instructions that, when executed by at least one computer processor of the apparatus, cause the apparatus to:

process an input speech utterance to produce a sequence of representative speech vectors; and
perform a single time-synchronous speech recognition pass using a decoding search to determine a recognition output corresponding to the speech input, wherein during the decoding search the apparatus:
i. for each speech vector before some first threshold number of speech vectors, estimates a feature transform based on a conventional feature normalization transform,
ii. for each speech vector after the first threshold number of speech vectors, estimates the feature transform based on the preceding speech vectors in the utterance and partial decoding results of the decoding search,
iii. adjusts a current speech vector based on the feature transform, and
iv. uses the adjusted current speech vector in a current frame of the decoding search;
wherein for each speech vector after the first threshold number of speech vectors and before some second threshold number of speech vectors, the feature transform is interpolated between the transform based on the conventional feature normalization and the transform based on the preceding speech vectors in the utterance and the partial decoding results of the decoding search.

18. The apparatus of claim 17 wherein the feature transform is based on maximizing the likelihood of observing the preceding speech vectors.

19. The apparatus of claim 18 wherein a most likely state alignment is used for estimating the feature transform.

20. The apparatus of claim 18 wherein an approximate state alignment is used for estimating the feature transform.

21. The apparatus of claim 18 wherein adaptation statistics required for the feature transform are accumulated incrementally.

22. The apparatus of claim 17 wherein the feature transform is a constrained maximum likelihood linear regression (CMLLR) feature transform.

23. The apparatus of claim 17 wherein the feature transform is a diagonal-only feature transform.

24. The apparatus of claim 17 wherein the time-synchronous speech recognition pass is part of a multi-pass recognition process.

* * * * *